(12) United States Patent
Jacob (10) Patent No.: US 8,885,822 B2
(45) Date of Patent: Nov. 11, 2014

(54) FUZZY PROTECTION OF VISUAL CONTENT

(75) Inventor: Stephane Jean-Louis Jacob, Floirac (FR)

(73) Assignee: Photint Venture Group Inc., Road Town (VG)

(*) Notice: Subject to any disclaimer, the term of this patent is extended or adjusted under 35 U.S.C. 154(b) by 818 days.

(21) Appl. No.: 12/527,059

(22) PCT Filed: Feb. 14, 2008

(86) PCT No.: PCT/IB2008/000334
§ 371 (c)(1),
(2), (4) Date: Aug. 13, 2009

(87) PCT Pub. No.: WO2008/099271
PCT Pub. Date: Aug. 21, 2008

(65) Prior Publication Data
US 2010/0027791 A1    Feb. 4, 2010

(30) Foreign Application Priority Data
Feb. 14, 2007    (IN) .............................. 307/DEL/2007

(51) Int. Cl.
*H04N 7/167*    (2011.01)
*H04N 21/2347*    (2011.01)

(52) U.S. Cl.
CPC ......... *H04N 7/1675* (2013.01); *H04N 21/2347* (2013.01)
USPC ........................................................ 380/210

(58) Field of Classification Search
USPC ..................................... 380/44, 210, 259, 42
See application file for complete search history.

(56) References Cited

U.S. PATENT DOCUMENTS

| 5,321,748 A | 6/1994 | Zeidler et al. |
| 6,147,709 A | 11/2000 | Martin et al. |
| 6,252,603 B1 | 6/2001 | Oxaal |

(Continued)

FOREIGN PATENT DOCUMENTS

| EP | 0633703 A | 1/1995 |
| EP | 0949815 A | 10/1999 |

(Continued)

OTHER PUBLICATIONS

"PCT International Search Report dated Jul. 28, 2008 for PCT/IB2008/000334, from which the instant application is based," 5 pgs.

(Continued)

*Primary Examiner* — Beemnet Dada
(74) *Attorney, Agent, or Firm* — Fredrikson & Byron, PA (57) ABSTRACT

A method and system for encoding visual information are described. An image is divided in to n number of patterns. Each pattern is mapped on a matrix i.e positioned on X and Y-axis. The patterns are then arranged in a different and new shape for e.g. a rectangle, to that of the original shape of the image but having the same number of patterns or same area. The patterns of pixels are then relocated in the new shape and a matrix is again mapped for the new arrangement of patterns. A key is then generated comprising the information of the encrypted and earlier image. In order to decrypt the encrypted visual content or the encrypted image, the player reads the key or encrypted visual content and decrypts the encrypted visual content or image by means of the information provided by the key.

23 Claims, 12 Drawing Sheets

(56) References Cited

U.S. PATENT DOCUMENTS

| | | | |
|---|---|---|---|
| 6,535,687 B1 * | 3/2003 | Tinker et al. | 386/252 |
| 6,584,200 B1 * | 6/2003 | Tanaka | 380/216 |
| 6,795,090 B2 | 9/2004 | Cahill et al. | |
| 6,947,059 B2 | 9/2005 | Pierce et al. | |
| 7,293,172 B2 * | 11/2007 | Nishimura et al. | 713/161 |
| 2002/0147991 A1 | 10/2002 | Furlan et al. | |

FOREIGN PATENT DOCUMENTS

| | | |
|---|---|---|
| JP | 06052633 A | 2/1994 |
| JP | 2001275111 A | 10/2001 |
| WO | 0108412 A | 2/2001 |

OTHER PUBLICATIONS

"PCT Written Opinion dated Jul. 28, 2008 for PCT/IB2008/000334, from which the instant application is based," 6 pgs.

"PCT International Search Report dated Apr. 11, 2009 for PCT/IB2008/000332," 4 pgs.

"PCT Written Opinion dated Apr. 11, 2009 for PCT/IB2008/000332," 6 pgs.

"Pseudocylindrical Projections" [Online] Nov. 2006, XP002523717, Retrieved from the Internet: URL:htt;P//web.archive.org/web/20061119174921/http://www.progonos.com/furuti/MapProj/Dither/ProjPCyl/projPCy].html> [retrieved on Apr. 14, 2009] Section "Collignon Projection" (six pages).

"Conformal Projections"[Online] Nov. 2006, XP002523718 Retrieved from the Interneta; USL:http://web.archive.org/web/20061119162502/www.progonos.com/furuti/MapProj/Normal/ProjConf/projConf.html> [retrieved on Apr. 14, 2009] section "World Maps by Adams" figure "Adams' world in a square (1929)" (ten pages).

Zelnik-Manor, L. et al., "Squaring the circle in panoramas," Proceedings. Tenth IEEE International Conference on Computer vision IEEE Comput. Soc. Los Alamitos, CA, USA, vol. 2, 2005, pp. 1292-1299 vol. XP00252371 (eight pages).

Li, S.: "Full-view spherical image camera," Proceedings—International Conference on Pattern Recognition—Proceedings—18th International Conference on Pattern Recognition, ICPR 2006 2006 Institute of Electrical and Electronics Engineers Inc., US, vol. 4, 2006, pp. 386-390, XP002523601 (five pages).

German, D.M., et al., "New methods to project panoramas for practical and aesthetic purposes," Computational Aesthetics in Graphics, Visualization, and Imaging, 2007, Jun. 2007, pp. 13-22, XP002523600 (eight pages).

* cited by examiner

| ORIGINAL MATRIX POSITION 2048 PATTERNS |
| --- |
| 01 – X1;Y1 |
| 02 – X2;Y1 |
| 03 – X3;Y1 |
| -- |
| 129 – X1;Y3 |
| -- |
| 2047 – X63;Y32 |
| 2048 – X64-Y32 |

FIGURE 6c

| FUZZY MATRIX POSITION 2048 PATTERNS |
| --- |
| 01 – X1;Y1 |
| 02 – X2;Y1 |
| 03 – X256;Y8 (max coord) |
| -- |
| 129 – X1;Y3 |
| -- |
| 2047 – X63;Y32 |
| 2048 – X64-Y32 |

FUZZY PROTECTION OF VISUAL CONTENT

RELATED APPLICATIONS

This application is a 35 U.S.C. 371 national stage filing from International Application No. PCT/IB2008/000334 filed Feb. 14, 2008 which claims priority to Indian Application No. 307/DEL/2007 filed Feb. 14, 2007 the teachings of which are incorporated herein by reference.

FIELD OF THE INVENTION

The instant invention relates to the field of image processing, encryption and decryption of digital visual content and in particular to fuzzy protection of visual content by disallowing unauthorized access of visual content. The present invention is also related to Coder/Decoder application in the field of image processing.

BACKGROUND OF THE INVENTION

Entertainment industry includes movie, cable TV, screenplays etc. Movie has been a major industry in the world of entertainment. The production of a movie requires a huge sum of money, talent of people and a great amount of effort. These efforts, money and talent of too many people involved in the formation of a movie or a screenplay bear no fruits at the end if copied or accessed by unauthorized people. Also, there are confidential images or moving pictures, which might be of ultimate secrecy to the welfare of the nation and requires strong security. Thus, in order to protect such crucial visual information from unauthorized accesses, a method and a system for securing digital visual content are in core need.

In present times various techniques have been used to stop copying of visual information. For instance, image watermarking is the process by which some information is inserted within a host image, e.g. to enable copyright protection or image authentication. Several, often conflicting, requirements are imposed on the insertion mechanism, such as invisibility, robustness, high information content, and fast and reliable detection.

However, so far there have been no conventional techniques or system to disallow viewing of secured visual information to an unauthorized person.

Hence, there is a strong need for a system and method which disallows viewing of important and sensitive visual information by an unauthorized person.

Television encryption, often referred to as "scrambling", is used to control access to pay television services, usually cable or satellite television services. Pay television exists to make revenue from subscribers and sometimes those subscribers don't pay. The prevention of piracy on cable and satellite networks has been one of the main factors in the development of Pay TV encryption systems.

The early cable based Pay-TV networks used no security. This led to problems with people connecting to the network without bothering to pay. Consequently, some methods were developed to frustrate these self-connectors. The early Pay-TV systems for cable television were based on a number of simple measures. The most common of these was a channel based filter that would effectively stop the channel being received by those who had not subscribed. These filters would be added or removed according to the subscription. As the number of television channels on these cable networks grew, the filter based approach became increasingly impractical.

Other techniques such as adding an interfering signal to the video or audio began to be used as the simple filter solutions were easily bypassed. As the technology evolved, addressable set top boxes became common and more complex scrambling techniques such as digital encryption of the audio or video cut and rotate (where a line of video is cut at a particular point and the two parts are then reordered around this point) were applied to signals.

Encryption was used to protect satellite distributed feeds for cable television networks. Some of the systems used for cable feed distribution were expensive. As the DTH market grew, less secure systems began to be used. Many of these systems (such as OAK Orion) were variants of cable television scrambling systems that affected the synchronization part of the video, inverted the video signal or added an interfering frequency to the video. All of these analogue scrambling techniques were easily defeated.

Usually a video player, which is a kind of media player can be used for playing back digital video data from media such as optical discs (for example, DVD, VCD), as well as from files of appropriate formats such as MPEG, AVI, Real Video, and QuickTime. Many of the video players also support simple playback of digital audio making the content susceptible to unauthorized access. Hence cryptographic techniques are used to secure the same. In modern times, the study of cryptography is relied upon for securing digital content. Cryptography is considered to be a branch of both mathematics and computer science, and is affiliated closely with information theory, computer security, and engineering.

Hence there is a need for a system and method to encrypt digital content to make it secure and inaccessible to unauthorized access.

SUMMARY OF THE INVENTION

In order to achieve the above objectives and advantages, the instant invention encrypts visual content i.e. still or moving image so as to disallow any unauthorized person to access the visual content.

Advantageously, the instant invention leads to repositioning of equal sized patterns of pixels so as to hide or encrypt the visual information.

The above objectives or advantages have been disclosed in the specification so as to clarify the invention closely. However, the scope of the above invention should not be constrained or limited by the above objectives or advantages.

According to the present invention, the image is divided in to n number of patterns each having a×b pixels. The n patterns of a×b pixels are mapped on a matrix i.e. are positioned on X and Y-axis. The n patterns are then arranged in a different and new shape for e.g. a rectangle, to that of the original shape of the image but having the same number of patterns or same area. The patterns of pixels are then relocated in the new shape and a matrix is again mapped for the new arrangement of patterns. A key is then generated comprising the information of the encrypted and earlier image, which is stored along with the still or moving image file.

In order to decrypt the encrypted visual content or the encrypted image, the player reads the key or encrypted visual content and decrypts the encrypted visual content or image by means of the information provided by the key.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF THE INVENTION

A method and system for securing digital visual information are described. The system and methods are not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The coder part of the present invention can be used either as a standalone application or can be integrated as an existing export tool. However, the decoder part of the instant invention has to be integrated into existing application, basically a video or multimedia player that deliver and display visual content to end user.

In an embodiment, an equirectangular image or movie is herein divided in to equal patterns of 16×16 pixels and then are positioned in accordance to disclosed method of the instant invention in a new texture of ratio 32:1. The advantage of the instant method is brought about by the repositioning of patterns of the image and that too in a different texture for instance position of 16×16 pixel patterns might be changed after every 100 patterns of 16×16 pixels.

Figure 1:
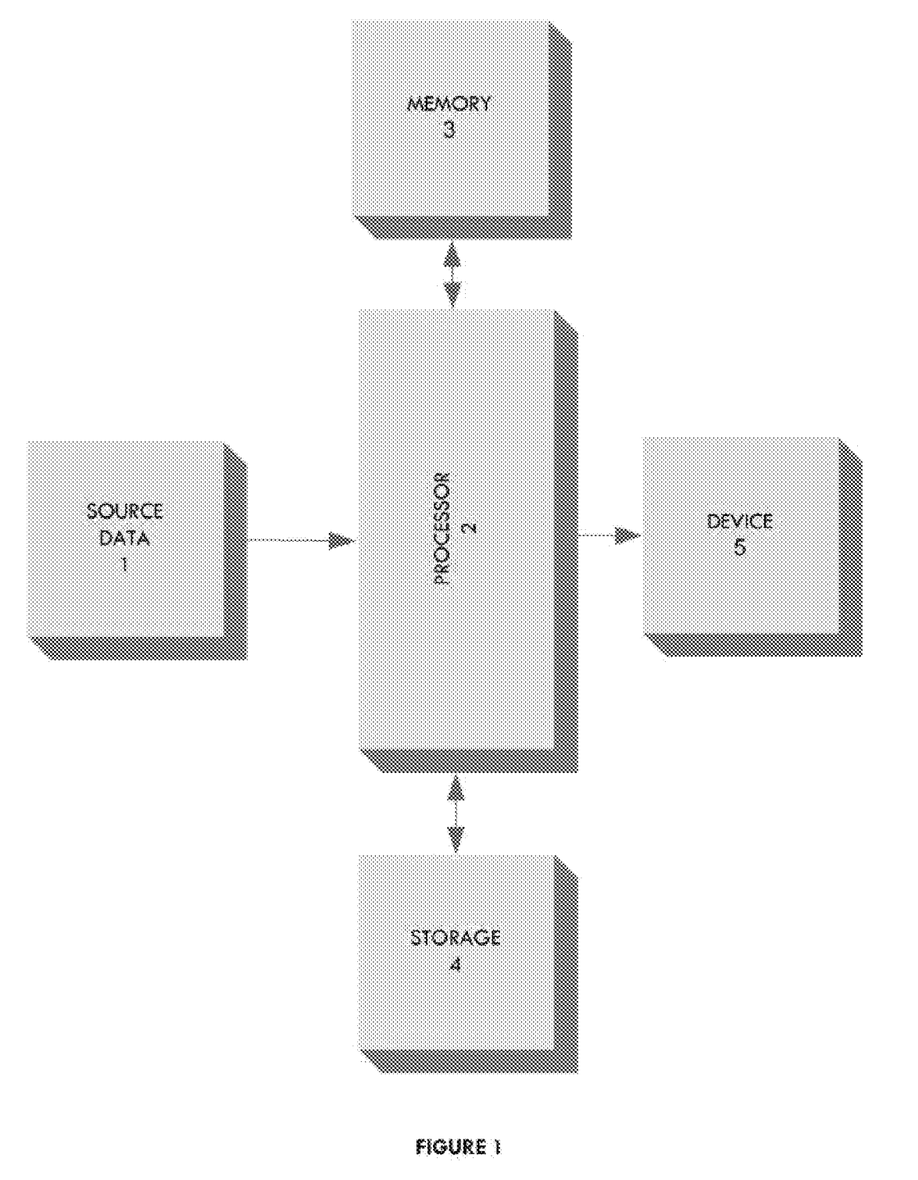
FIG. 1 depicts a hardware representation of a possible integration of the software
Figure 2:
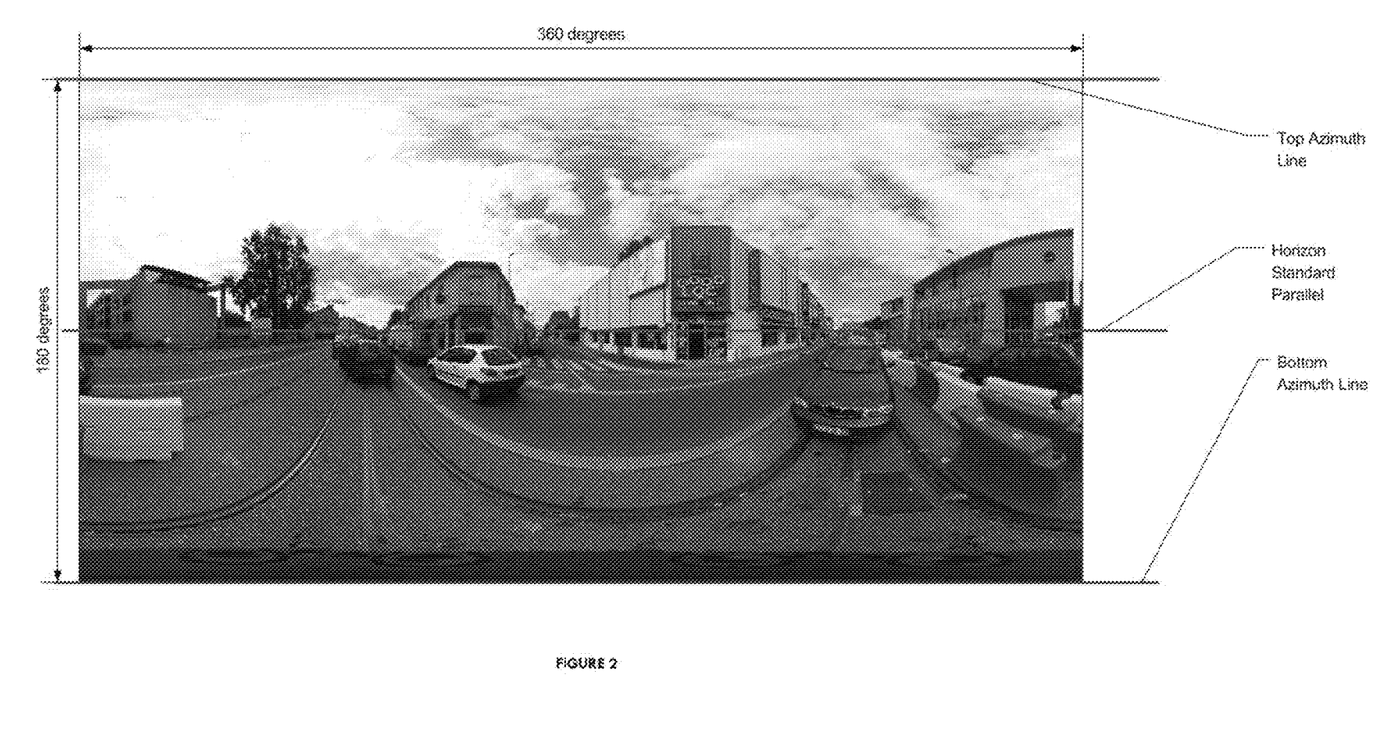
FIG. 2 represents an equirectangular image

The image in FIG. 2 represents an Equirectangular image (expressed in pixels) with 360 degrees horizontal information and 180 degrees vertical information. This image aspect ratio is 2:1 that mean that the width is twice larger than the height.

Figure 3:
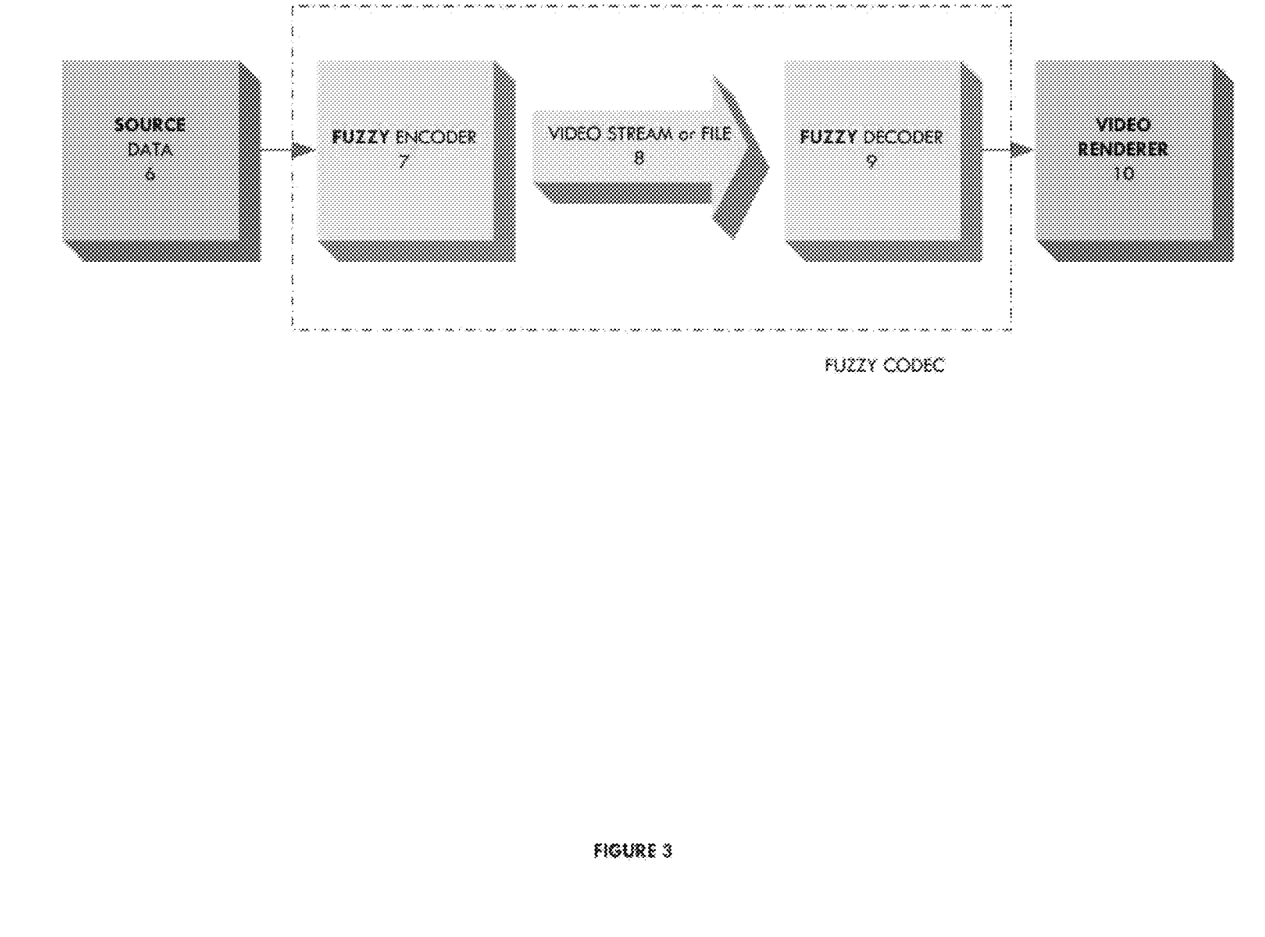
FIG. 3 is a schematic drawing representing the stream of data going through the FUZZY codec

In FIG. 3, the SOURCE DATA in 6 is encoded through the FUZZY ENCODER in 7 that delivers a multimedia file or video stream in 8. The VIDEO STREAM is then sent to the FUZZY DECODER in 9 that decodes the information, and sends it to the VIDEO RENDERER in 10.

Figure 4A:
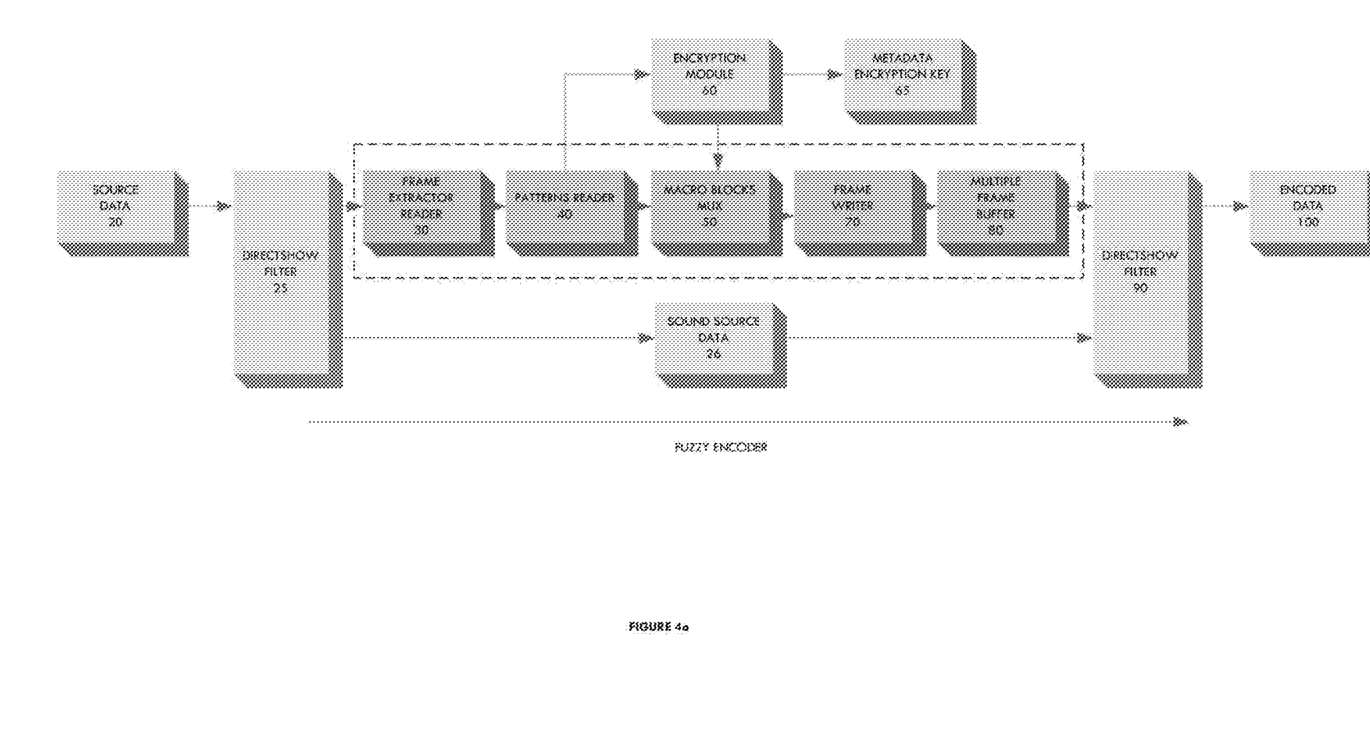
FIG. 4a illustrates the encoding process through the fuzzy encoder

FIG. 4a depicts the encoding process. The Source data in 20 can be a video file, a video stream or a still image. This data have to be a multimedia file at least understandable by an API similar to any DirectShow Filter in 25. This source Data is described in resolution information (in pixels AREA), in Compression type, in Frame Rate (in FPS) and in Color Depth. The sound information at that point is not encrypted and is not processed through the FUZZY ENCODER. The original sound data 26 is then directly transmitted from the step 25 to the step 90, where the encoded file is written. The synch information is kept in 25 (which is the same API as 90) and used in 90 to write the ENCODED DATA.

The Source Data is loaded in the Fuzzy Encoder through the FRAME EXTRACTOR READER in 30, as the preferred process have to be computed frame by frame to prevent any data loss. This module read the incoming data and extracts each frame separately one by one. This process is well known and is processed first through an API from Microsoft called DIRECTSHOW FILTER in 25. Each frame has to be progressive to prevent any compression anomaly.

DirectShow divides the processing of multimedia tasks such as video playback into a set of steps known as filters. Each filter represents a stage in the processing of the data. Filters have a number of input and output pins which connect them together.

Then the Frame extracted in 30 is analysed in the PATTERNS READER in 40, where the whole image, expressed in pixels is converted into patterns of 16×16 pixels (to fit the macroblock size fixed by existing compression codec used with the AVI container and MPEG formats). Then the patterns locations are stored to be scrambled into a new position by the ENCRYPTION MODULE in 60.

The ENCRYPTION MODULE in 60 generates a key that provides new positions for each patterns extracted in 40. The key can be generated using many well known existing possibilities such as a Keygen. The key can also be generated manually using empiric methods. The Encryption Key is needed in 140 to re format the ENCODED DATA 100. The Encryption key is generated on the ENCODER device, and can be provided to the DECODER device using all existing methods to transport data. The Encryption key can be embedded into the DECODER as an electronic device as well. Obviously, the key has to be delivered to the DECODER using a separate way as the ENCODED DATA to maintain the security level. Depending on the security level needed, that Encryption key can also be encrypted using a know encryption algorithm, or can be delivered as a text file.

The final ENCODED DATA 100 has exactly the same number of patterns (Macroblocks) than the SOURCE DATA 20.

Then the full frame is generated in the MACRO BLOCKS MUX (Multiplexer) in 50, using the new PATTERNS position generated using the key in 60 from the sources acquired in 40. Once that step is completed, the frame is written by the FRAME WRITTER in 70 and stored into the MULTIPLE FRAME BUFFER in 80.

The MULTIPLE FRAME BUFFER 80 function is to store the needed number of frames to compute the final compression algorithm by the DIRECTSHOW FILTER 90. The number of frames stored before compression depends on the compression key frame required by the compression filter. It is also indexed with the position in the file where the encryption key changes the position of each pattern. It is also possible that the encryption key is set up only at the beginning of the file, but it can also change with a certain frequency, interlaced with existing frames.

This part completes the encryption process included in the ENCODER part. The Encoder part is usually not played on the same device as the DECODER part. The two elements could be linked with known methods if the ENCODED DATA in 100 is a stream data and not a recorded file.

Figure 4B:
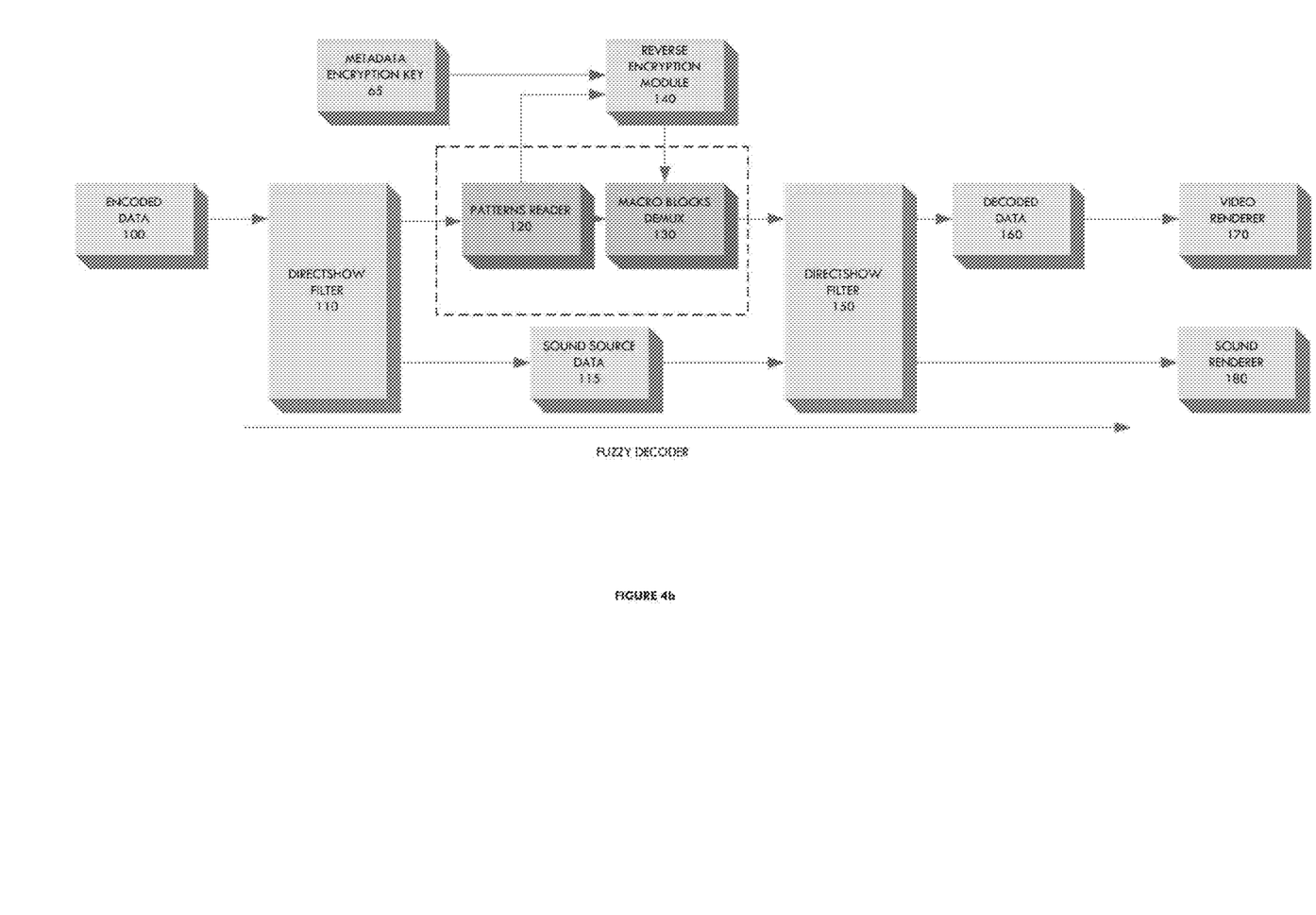
FIG. 4b illustrates the decoding process through the fuzzy decoder FIG. 5a defines configuration with one group of users FIG. 5b defines configuration with multiple groups of users

FIG. 4b represents the decoding process. While the ENCODED DATA is transmitted or stored on an other DEVICE to be played, the data is processed through the DIRECTSHOW FILTER in 110.

Then, the DIRECTSHOW FILTER is directly connected to the PATTERNS READER in 120 that format the pattern information for the MACRO BLOCKS DEMUX (Demultiplexer) in 130 where all the patterns are re-organised, using the encryption key imported into the REVERSE ENCRYPTION MODULE in 140. As said before, the key could be easily write in hard in the device as a ROM data for example. At that point, all the patterns are re-organised as the original SOURCE DATA (with the compression off course).

The re-organised data is sent to the DIRECTSHOW FILTER in 150 that generate the DECODED DATA in 160 using existing functions.

The DATA at that point cannot be stored as a multimedia file using different filter to prevent non authorised user to have access to non encrypted data.

The DIRECTSHOW FILTER in 110 split the AUDIO/VIDEO information, as the AUDIO doesn't have to be processed through the FUZZY DECODER part, and is directly transmitted to the output part of the DIRECTSHOW filter in 150.

The DIRECTSHOW FILTER in 150 connects and synchronise together again the two components of the multimedia file. The video part, known here as the DECODED DATA in 160, is sent to the VIDEO RENDERER 170 that manages graphic information for the display device. The sound part is sent to the SOUND RENDERER in 180 that manages the sound device.

Figure 5A:
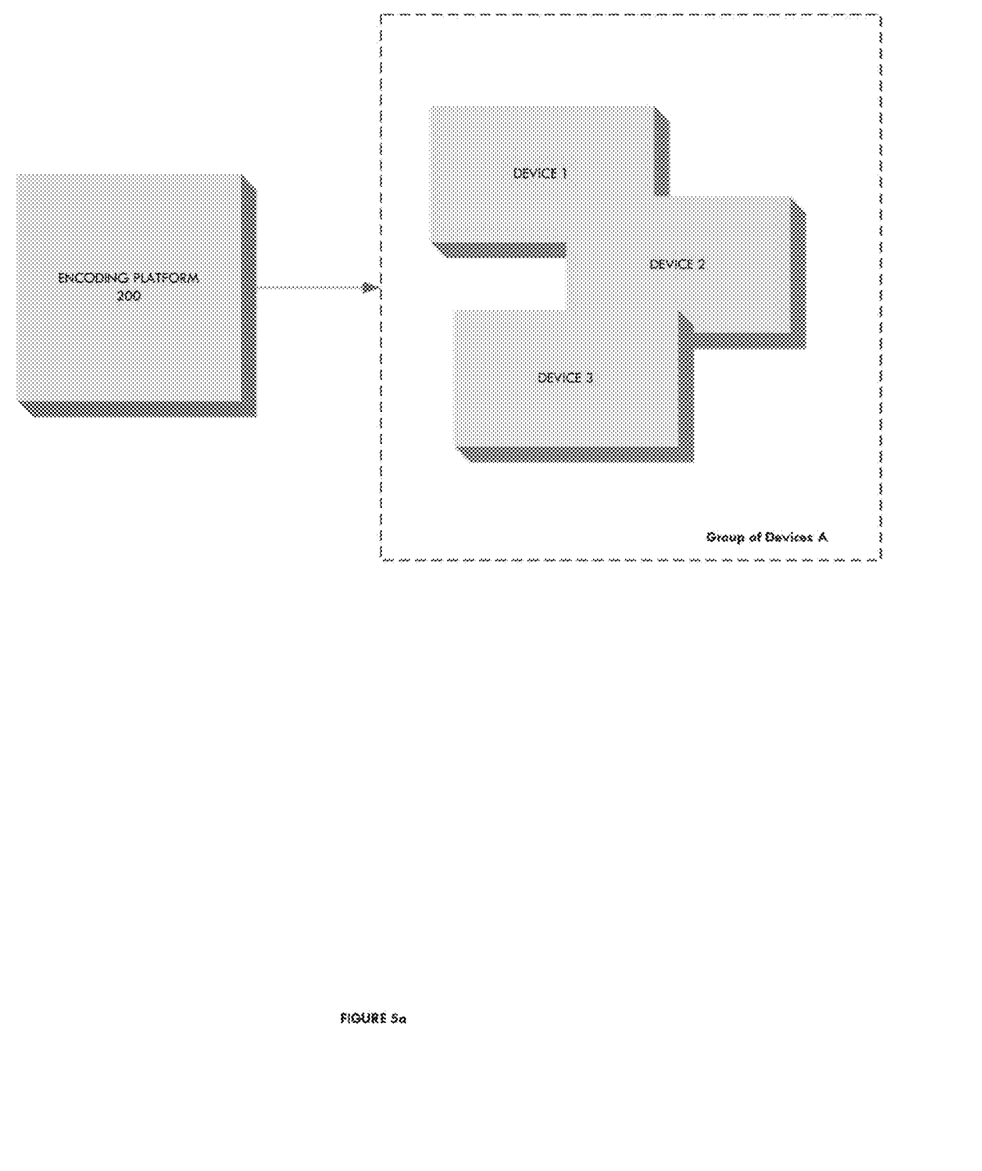

FIG. 5a represents the case when a unique encryption key is provided and used. All the end users of group A using the player application are allowed to use and display the content encoded by the ENCODING PLATFORM 200. The only limitation is that they are allowed to display the content, but they are not allowed to modify it.

Figure 5B:
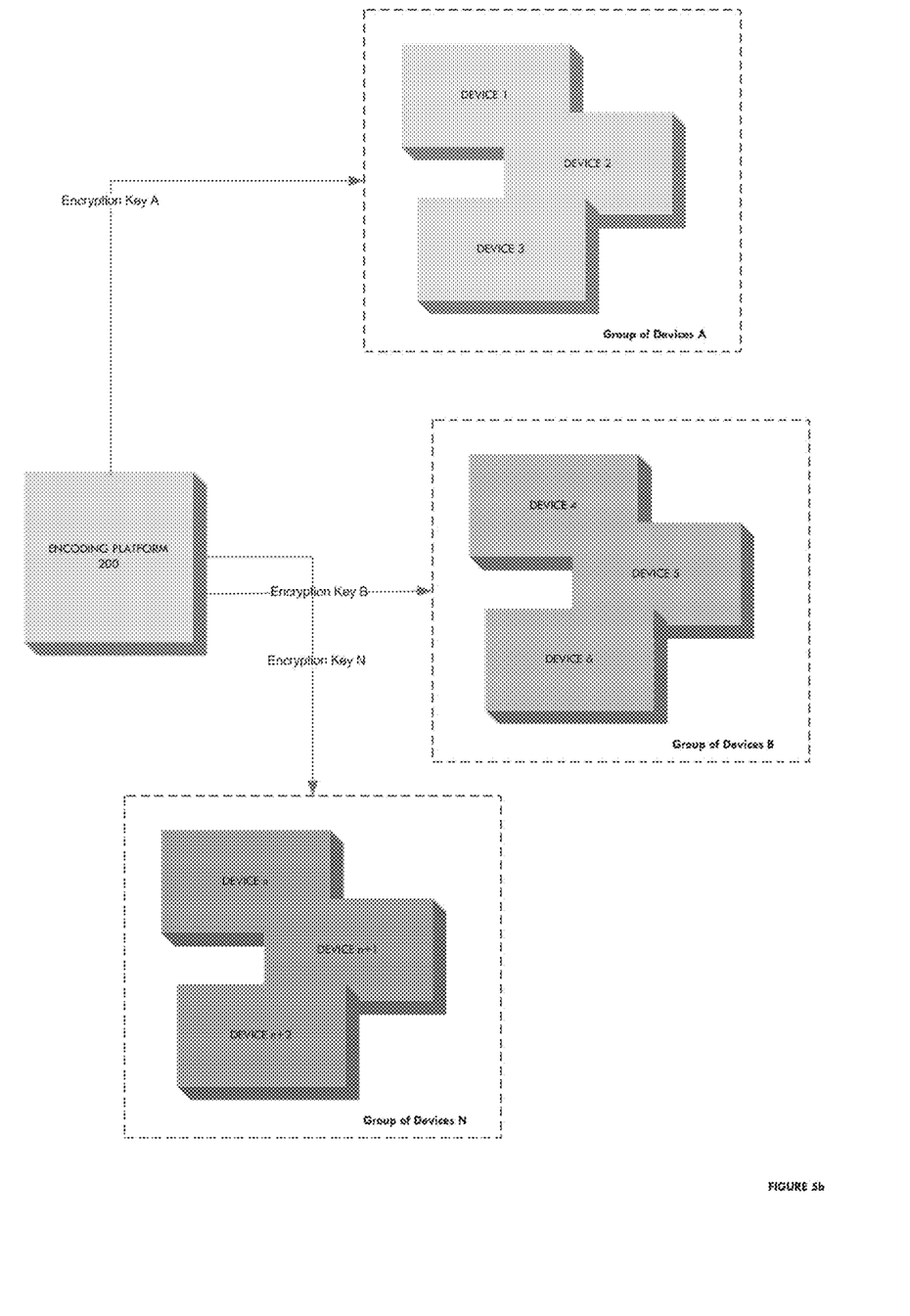

FIG. 5b represents the case when multiple groups of users are present.

Each key have to be assigned to a group of content for encryption and to a group of end users for display.

Each key can be generated and encrypted on the same ENCODING PLATFORM 200 or can be encoded and used on multiple ENCODING Platforms.

Let's say that we have N groups of different users. Each one has an encryption key different. The Key A is dedicated to the group A, the key B is dedicated to the group B, and the key N is dedicated to the group N. The restriction between different keys and then different groups are not restricted.

The common case should be that Group A have only access to the media encrypted with the key A, and the Group B has only access to the media encrypted with the key B, and so on.

FIGS. 6a to 6e are provided as an example only. In this example, we consider that the SOURCE DATA is already extracted and is a progressive scan equirectangular frame, with a size of 1024 pixels width and 512 pixels height. The process is integrated as a loop, and each frame have to be processed one by one before compression.

Figure 6A:
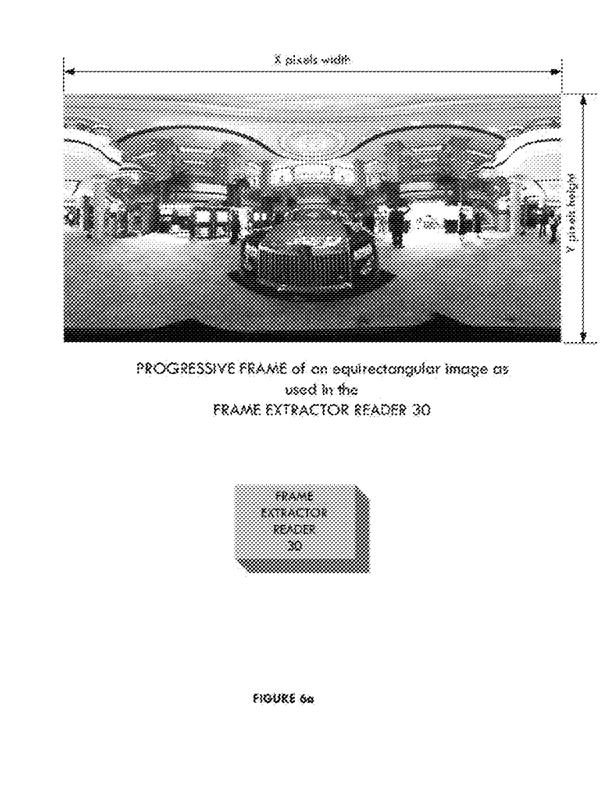
FIGS. 6a to 6e represent a graphical illustration about the way the encryption key is generated

FIG. 6a shows an equirectangular image of 1024×512 Pixels i.e. 2048 patterns of 16×16 pixels. This frame represents the typical image that could be extracted by the FRAME EXTRACTOR READER 30.

Figure 6B:
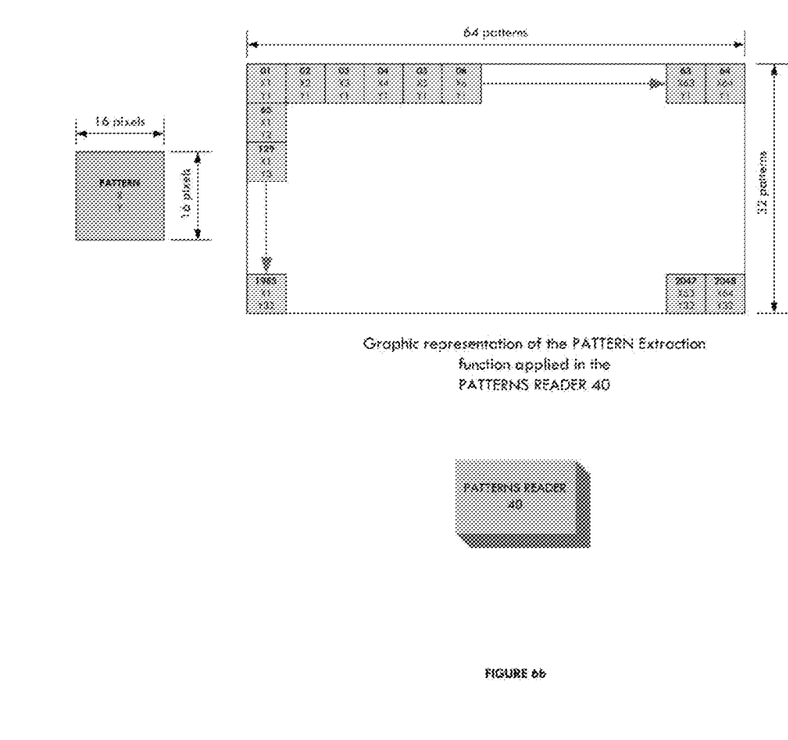

FIG. 6b represents a graphic representation of the PATTERN extraction function working in the PATTERNS READER 40. Therefore, the length of the image comprises of 64 patterns of 16×16 pixels and width comprises of 32 patterns of 16×16 pixels.

Figure 6C:
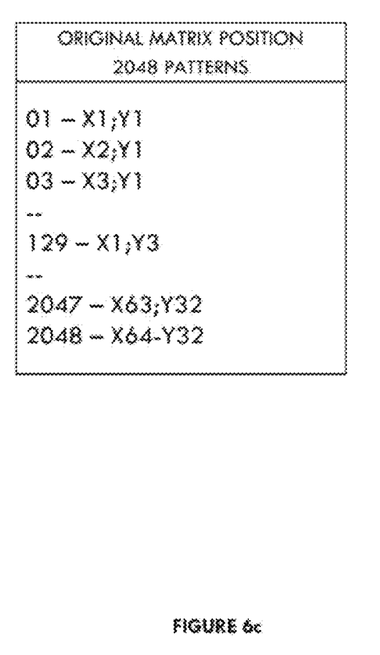

FIG. 6c is a matrix formed so as to represent the positioning of each pattern on X and Y-axis. Thus, by means of a matrix each pattern of 16×16 pixels is given a coordinate as (X, Y).

Figure 6D:
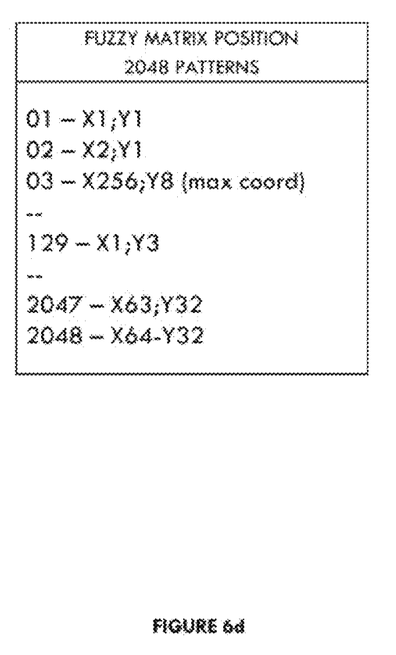
Figure 6E:
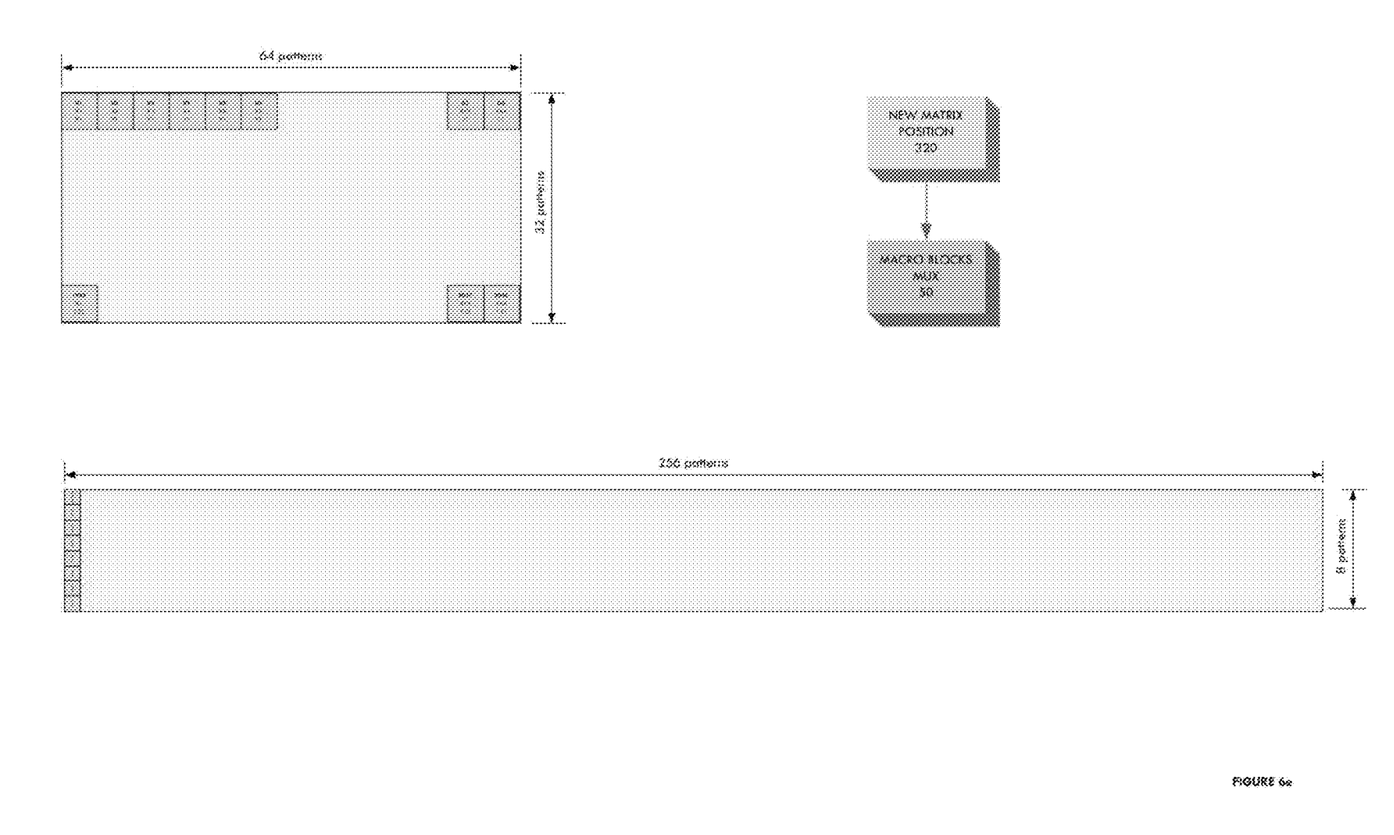
Figure 7:
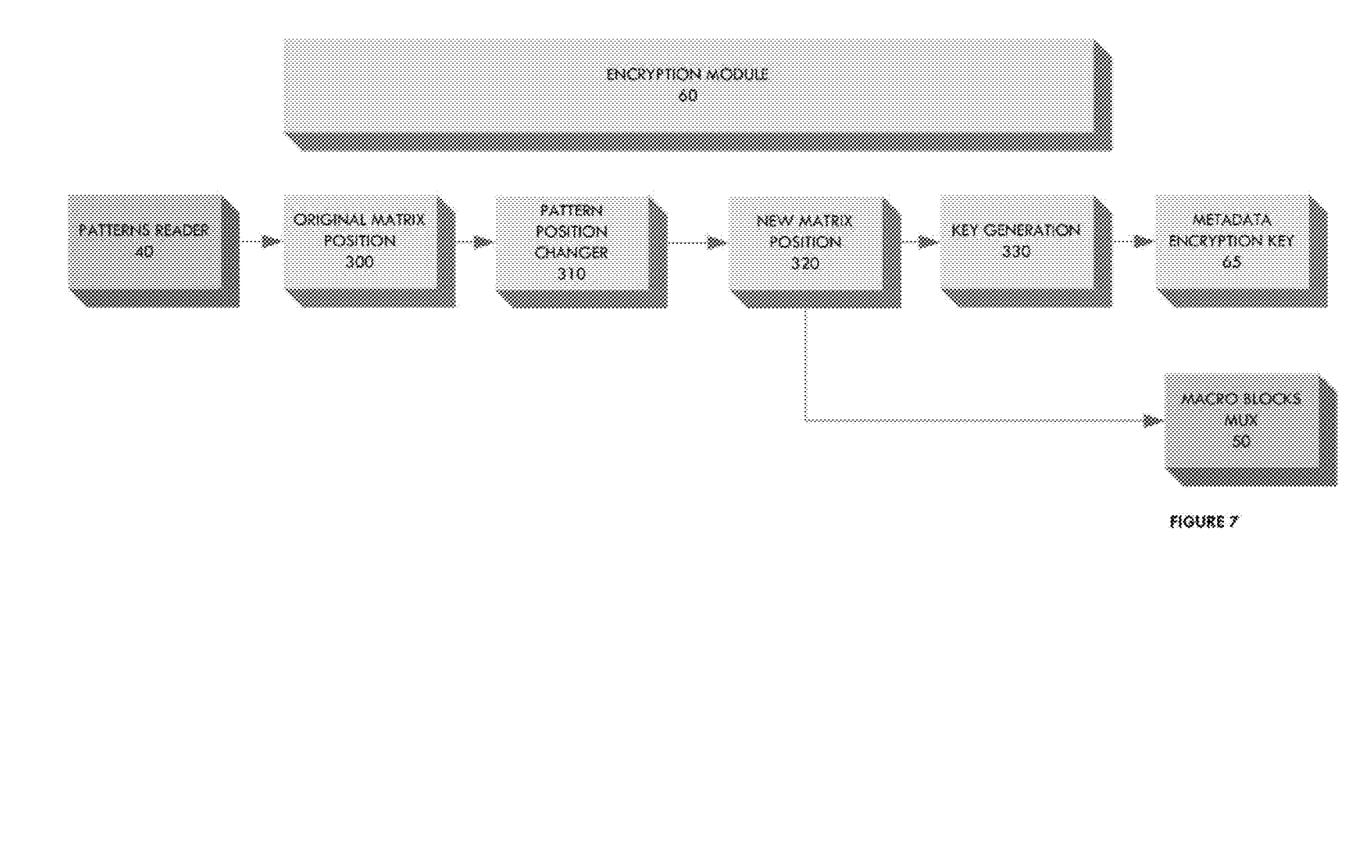
FIG. 7 represents the details of the ENCRYPTION MODULE

FIG. 6d represents the new matrix after encryption process 320, shown in FIG. 6e and FIG. 7.

In FIG. 6e, a new shape with the same number of patterns accommodation facility is created i.e. in present embodiment the new shape comprises of 2048 pattern accommodation capacity, which is equivalent to that of the original, unencrypted image shape's pattern accommodation capacity. The new shape in which the patterns are relocated is a rectangular shape. However, the area covered by the patterns remains the same. Herein the embodiment the new shape is a rectangle having 256 patterns along the length and 8 patterns along the width. Thus, herein the number of patterns along the length and number of patterns along the width is in the ratio of 32:1. In step 4 the patterns are relocated in the new shape that is the rectangular shape, the patterns are relocated in a special order by applying a fuzzy algorithm.

FIG. 7 represents the detail of the ENCRYPTION MODULE 60 of FIG. 4a, where the ORIGINAL MATRIX POSITION 300 receives the information regarding the patterns through the PATTERNS READER 40. The information collected is the number of patterns and their original location into the matrix. This information is described as the MATRIX. These matrix variables are then scrambled in the PATTERN POSITION CHANGER 310 are recombined into a new matrix in the NEW MATRIX POSITION 320. The way the variables positions are scrambled can be managed manually by the end user that manages the ENCODING process. It can be as well imported as a text file following the right formatting. Then, the new matrix position information is sent to the KEY GENERATION 330 and to the MACRO BLOCKS MUX 50. The KEY GENERATION 330 generate a encryption key, based on the new matrix position information, using well known existing methods. That key source is then saved as a METADATA ENCRYPTION KEY 65, to be used later on the Player device.

Figure 8:
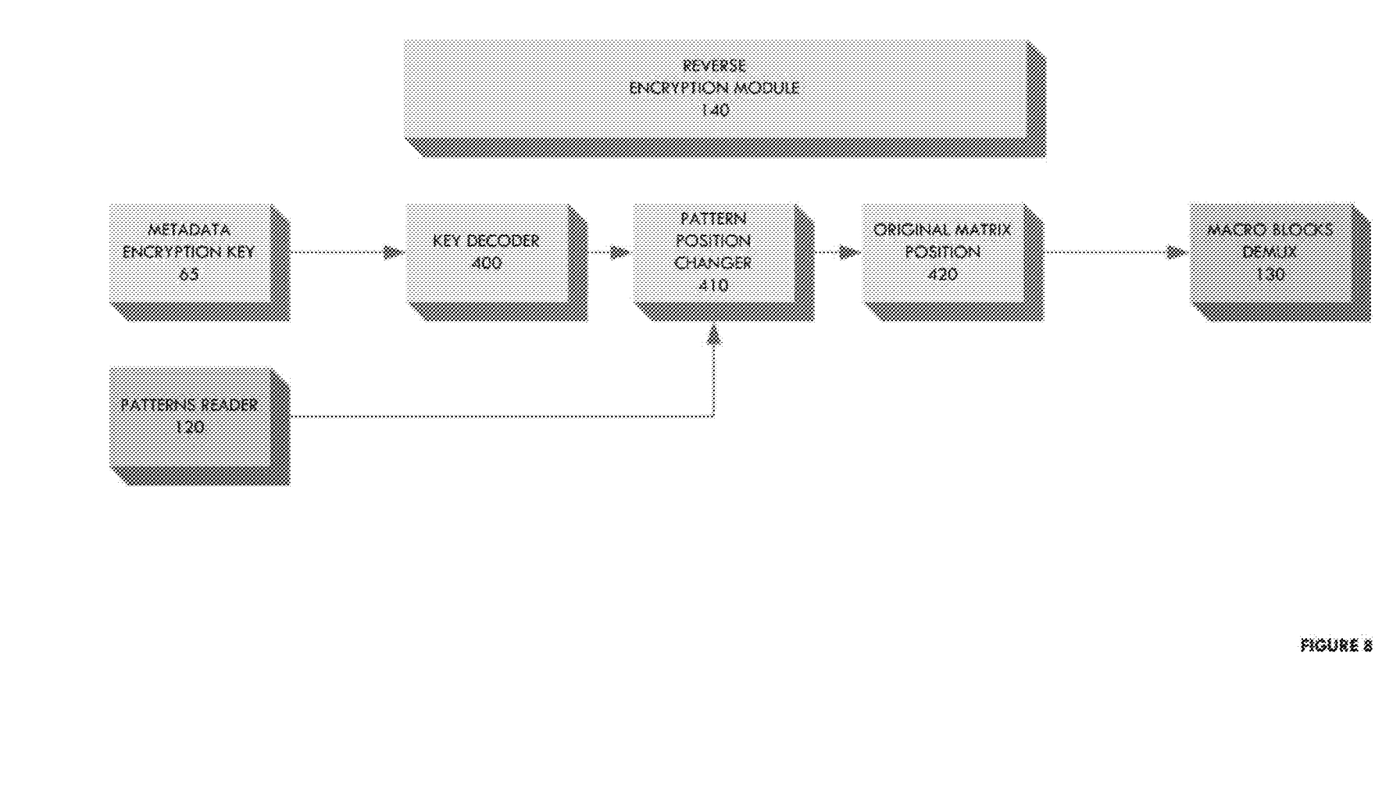
FIG. 8 represents the details of the REVERSE ENCRYPTION MODULE

FIG. 8 represents the detail of the REVERSE ENCRYPTION MODULE 140 of FIG. 4b. The KEY DECODER 400 receives the METADATA ENCRYPTION KEY 65, where the process re-creates the original matrix information relative to the patterns positions in the frame. The PATTERN POSITION CHANGER 410 receives the incoming pattern position from the PATTERNS READER 120 with the KEY DECODER information. This provides the original matrix position in ORIGINAL MATRIX POSITION in 420. This information is then sent to the MACRO BLOCKS DEMUX in 130 in order to generate the original frame to be managed by the DIRECTSHOW FILTER in 150. The key information is not restricted to the pattern position in the frame.

EMBODIMENT OF THE INVENTION

The system CODEC (Coder Decoder) is then combining two separated parts:
- The Coder that encode the raw video file or stream using an encryption key,
- The Decoder that decode the encrypted data using the original encryption key information, and deliver the video file reconverted in his original form to the video renderer for display.

The two individual parts are two separates processes that are operational on two distinct computers or CPU systems.

The key, if unique, can provide information to only one group of users that have access to the unique information.

The key can have an unlimited life duration time, or can be limited in time. For example, if the media is a pay per view program, it is possible to generate a key that allow the end user, or the group of end users to play the video only for a limited time. If the delay of visualisation expired, then the end user is not allowed any more to play the content, and the player application can display a warning message.

The frame source data size has to be a multiple of 16 pixels for the width and the height. This is majority the case for all video already encoded using compression algorithms that fit this restriction.

The ENCODED DATA and the SOURCE DATA have the same volume of pixels, i.e. the same volume of patterns. The aspect ratio parameter of the ENCODED DATA can be the same than the SOURCE DATA, but it is not necessary. To make the task much complex for the user that wish to access to the SOURCE DATA, we modify the aspect ratio of the ENCODED DATA (VIDEO). The shape, the number of pixels and patterns are still the same (rectangle), but the measurement in width and height are different.

The aspect ratio of a two-dimensional shape is the ratio of its longer dimension to its shorter dimension. It is also applied to two characteristic dimensions of a three-dimensional shape, especially for the longest and shortest 'axes' or for symmetrical objects (e.g. rods) that are described by just two measures (e.g. length and diameter). In such cases, the aspect ratio may evaluate to a value less than one (e.g. consider very short and very long rods).

The preferred application of the invention is known as to protect image content for Equirectangular images or video files and streams, and can be applicable to all others images or video contents. The Equirectangular format is well known in the computer graphic industry It is most appreciated that the image data that will be processed through the Encoder has to be in an uncompressed format. It can work as well with compressed files, but the final result will not be as good as needed for different fields of applications, including the Entertainment industry Video compression typically operates on square-shaped groups of neighbouring pixels, often called a Macroblock.

The data can be one or multiple still images or one or multiple video files. The final processed file or files exported from the Encoder can then be stored or streamed directly to the Decoder in two different forms:

As an original video file using standard video compression. The AVI container (Audio Video Interleave) format or the new MPEG-4 format allows all kind of compression files. In this case, the encryption key is processed and sent (in the case it is not embedded directly in the Decoder) separately as a metadata, As a metadata file including video and data. Metadata is used to facilitate the understanding, use and management of data. The metadata required for effective data management varies with the type of data and context of use. In the context of an information system, where the data is the content of the computer files, metadata about an individual data item would typically include the name of the field and its length.

Each frame of the video has to be processed frame by frame at a low level, and the images need to be in a progressive scan format (not interlaced) in 24 bits, 32 bits or indexed colors.

The present invention is not intended to be restricted to any particular form or arrangement, or any specific embodiment, or any specific use, disclosed herein, since the same may be modified in various particulars or relations without departing from the spirit or scope of the claimed invention herein shown and described of which the apparatus or method shown is intended only for illustration and disclosure of an operative embodiment and not to show all of the various forms or modifications in which this invention might be embodied or operated

I claim:
1. A device for encoding visual information comprising:
filtering means to process the input information;
image processing means coupled to filtering means configured to extract and process information from the visual information frame by frame;
a pattern reader to store and convert each extracted frame into a predetermined number of patterns; and
an encryption means coupled to the image processing means to (a) rearrange the patterns into new positions within the pattern of the original aspect ratio and (b) rearrange the patterns rearranged into new positions within the original aspect ratio into a new pattern having a predetermined aspect ratio that is different from the original aspect ratio to generate encoded visual information, wherein the aspect ratio is the ratio of a longer dimension to a shorter dimension of a two-dimensional shape the encryption means also generates a symmetrical encryption key to decode the encoded visual information, the symmetrical encryption key recording the corresponding relationship between positions of the pattern before and after rearrangement by the encryption means.

2. A device as claimed in claim 1, wherein the image processing means is further configured to:
generate the full frame using the new positions generated;
store and write a predetermined number of generated frames required for final compression; and
encrypt the visual information to obtain encoded information.

3. A device as claimed in claim 1, wherein the visual information is a video file or a video stream.

4. A device as claimed in claim 1, wherein the visual information is a still image.

5. A device as claimed in claim 1, wherein the visual information is a multimedia file at least understandable by an API similar to said filtering means.

6. A device as claimed in claim 1, wherein said pattern format fits the macroblock size fixed by existing compression codec used with the AVI container and MPEG formats or any other video format.

7. A device as claimed in claim 3, wherein said encryption module generates a symmetric encryption key that provides new positions for each pattern extracted in said patterns reader.

8. A device as claimed in claim 1, wherein said encryption key is encrypted before transporting it to the decoder device.

9. A device as claimed in claim 1, wherein said encryption key is embedded into the decoder device as an electronic device.

10. A device as claimed in claim 1, wherein said encryption key is stored in the ROM data.

11. A device as claimed in claim 3, wherein the encoded information has exactly the same number of patterns as the visual information.

12. A device as claimed in claim 3, wherein the filtering means removes audio information from the input information.

13. A device for decoding encoded visual information, said device comprising:
means for receiving encoded data including encoded visual information divided into a predetermined number of patterns having a first aspect ratio;
a filter to process the encoded data in a series of stages;
a patterns-reader to analyze and format the encoded data of said data into preset pattern format;

a macro blocks DEMUX to rearrange the encoded data of said pattern information using an encryption key into a pattern organization having a second aspect ratio, wherein the second aspect ratio is different from the first aspect ratio, the encryption key recording the corresponding relationship between positions of the pattern before and after image rearrangement wherein the aspect ratio is the ratio of a longer dimension to a shorter dimension of a two-dimensional shape;

a reverse encryption module to provide the encryption key for reorganizing said pattern information; and a filter to generate the decoded data.

14. A device as claimed in claim 13, wherein said decoded data can't be stored as a multimedia file and thus prevents unauthorized access to non encrypted data.

15. A device as claimed in claim 13, wherein said filter splits the audio and video information.

16. A device as claimed in claim 13, wherein said decoded data corresponds to the video part of the input multimedia file.

17. A device as claimed in claim 16, wherein said video data is sent to the video renderer.

18. A device as claimed in claim 16, wherein said video renderer manages graphic information for the display device.

19. A device as claimed in claim 13, wherein the sound source data is directly sent from said filter to the sound renderer.

20. A device as claimed in claim 19, wherein said sound renderer manages the sound device.

21. A device as claimed in claim 13, wherein audio information is not processed and is directly transmitted from the first filter to the last filter.

22. A device as claimed in claim 13, wherein said filter connects and synchronizes the audio and video components of the multimedia file.

23. A codec for encoding and decoding visual information comprising:

filtering means to process the input information;

image processing means coupled to filtering means configured to extract and process information from the visual information frame by frame;

a pattern reader to store and convert each extracted frame into a predetermined number of patterns having an original aspect ratio;

an encryption means coupled to the image processing means to (a) rearrange the patterns into new positions within the pattern of the original aspect ratio and (b) rearrange the patterns rearranged into new positions within the original aspect ratio into a new pattern having a predetermined aspect ratio that is different from the original aspect ratio to generate encoded visual information wherein the aspect ratio is the ratio of a longer dimension to a shorter dimension of a two-dimensional shape, the encryption means also generates a symmetrical encryption key to decode the encoded visual information, the symmetrical encryption key recording the corresponding relationship between positions of the pattern before and after image rearrangement by the encryption means; and a decoder for decoding encoded information.

* * * * *